United States Patent
Darms et al.

(10) Patent No.: US 10,429,854 B2
(45) Date of Patent: Oct. 1, 2019

(54) METHOD AND SYSTEM FOR AUTOMATICALLY CONTROLLING A FOLLOWING VEHICLE WITH A SCOUT VEHICLE

(71) Applicant: VOLKSWAGEN AG, Wolfsburg (DE)

(72) Inventors: Michael Darms, Lehre (DE); Marc-Michael Meinecke, Sassenburg (DE); Arne Bartels, Wolfsburg (DE); Lutz Junge, Braunschweig (DE)

(73) Assignee: Volkswagen AG (DE)

( * ) Notice: Subject to any disclaimer, the term of this patent is extended or adjusted under 35 U.S.C. 154(b) by 335 days.

(21) Appl. No.: 15/377,456

(22) Filed: Dec. 13, 2016

(65) Prior Publication Data

US 2017/0168504 A1  Jun. 15, 2017

(30) Foreign Application Priority Data

Dec. 15, 2015  (DE) .......................... 10 2015 225 242

(51) Int. Cl.
*G05D 1/02* (2006.01)
*B60W 30/165* (2012.01)
(Continued)

(52) U.S. Cl.
CPC .......... *G05D 1/0295* (2013.01); *B60W 30/165* (2013.01); *G01C 21/00* (2013.01);
(Continued)

(58) Field of Classification Search
None
See application file for complete search history.

(56) References Cited

U.S. PATENT DOCUMENTS 10,185,327 B1 * 1/2019 Konrardy ............. G05D 1/0088
2013/0030606 A1 * 1/2013 Mudalige ................. G08G 1/22
701/2
(Continued)

FOREIGN PATENT DOCUMENTS

CN  2700161 Y  5/2005
CN  101842820 A  9/2010
(Continued)

OTHER PUBLICATIONS

Search Report for European Patent Application No. 16199171.6; dated Apr. 19, 2017.
(Continued)

*Primary Examiner* — David P. Merlino
(74) *Attorney, Agent, or Firm* — Barnes & Thornburg LLP

(57) ABSTRACT

A method and system for automatically controlling at least one following vehicle, where a scout trajectory is produced for a scout vehicle and the scout vehicle is guided along the scout trajectory. Scout environmental data are captured by scout sensors and a desired trajectory is produced for the following vehicle. Following vehicle environmental data are captured by following vehicle sensors. Reference trajectory data are produced based on the scout trajectory and reference environmental data are produced based on the scout environmental data. The reference trajectory data and the reference environmental data are transmitted to the following vehicle. A trajectory similarity is determined by a trajectory comparison of the desired trajectory produced and the transmitted reference trajectory data, an environment similarity is determined by an environmental data comparison of the captured following vehicle environmental data and the transmitted reference environmental data.

15 Claims, 3 Drawing Sheets

(51) Int. Cl.
  *G08G 1/01* (2006.01)
  *G01C 21/00* (2006.01)
  *B60W 50/00* (2006.01)

(52) U.S. Cl.
  CPC ......... *G05D 1/0212* (2013.01); *G05D 1/0221* (2013.01); *G05D 1/0246* (2013.01); *G08G 1/0112* (2013.01); *G08G 1/0129* (2013.01); *G08G 1/0145* (2013.01); *B60W 2050/0077* (2013.01); *B60W 2550/408* (2013.01); *B60W 2750/40* (2013.01); *G05D 2201/0213* (2013.01)

(56) References Cited

U.S. PATENT DOCUMENTS

| | | | | |
|---|---|---|---|---|
| 2014/0012494 | A1* | 1/2014 | Cudak | G01C 21/3415 |
| | | | | 701/412 |
| 2015/0127189 | A1* | 5/2015 | Mehr | B60W 30/165 |
| | | | | 701/1 |
| 2015/0177007 | A1 | 6/2015 | Su et al. | |
| 2015/0246672 | A1* | 9/2015 | Pilutti | B60W 30/00 |
| | | | | 701/2 |
| 2017/0318732 | A1* | 11/2017 | Yamashita | G01C 21/26 |
| 2018/0151072 | A1* | 5/2018 | Altinger | G08G 1/04 |

FOREIGN PATENT DOCUMENTS

| | | | | |
|---|---|---|---|---|
| CN | 102358287 A | 2/2012 | | |
| CN | 104471624 A | 3/2015 | | |
| CN | 104964692 A | 10/2015 | | |
| DE | 19949448 A1 | 5/2001 | | |
| DE | 102005059517 A1 | 6/2007 | | |
| DE | 102012009238 A1 * | 11/2012 | ............ | B60W 50/14 |
| DE | 102012212681 A1 | 1/2013 | | |
| DE | 102012208256 A1 | 11/2013 | | |
| DE | 102013212255 A1 * | 12/2014 | ............ | B60W 50/14 |
| DE | 102013212255 A1 | 12/2014 | | |
| DE | 102013225011 A1 | 6/2015 | | |
| WO | WO-2016020290 A1 * | 2/2016 | ......... | B62D 15/0265 |

OTHER PUBLICATIONS

Office Action for Chinese Patent Application No. 2016-11160060.5; dated Nov. 5, 2018.
Search Report for Chinese Patent Application No. 2016-11160060.5; dated Nov. 5, 2018.

* cited by examiner

METHOD AND SYSTEM FOR AUTOMATICALLY CONTROLLING A FOLLOWING VEHICLE WITH A SCOUT VEHICLE

PRIORITY CLAIM

This patent application claims priority to German Patent Application No. 10 2015 225 242.6, filed Dec. 15, 2015, the disclosure of which is incorporated herein by reference in its entirety.

SUMMARY

Illustrative embodiments relate to a method for automatically controlling at least one following vehicle. Illustrative embodiments also relate to a system for automatically controlling at least one following vehicle using a scout vehicle.

BRIEF DESCRIPTION OF THE DRAWINGS

The disclosed embodiments will be discussed in more detail with respect to the figures, in which.

DETAILED DESCRIPTION

Figure 1:
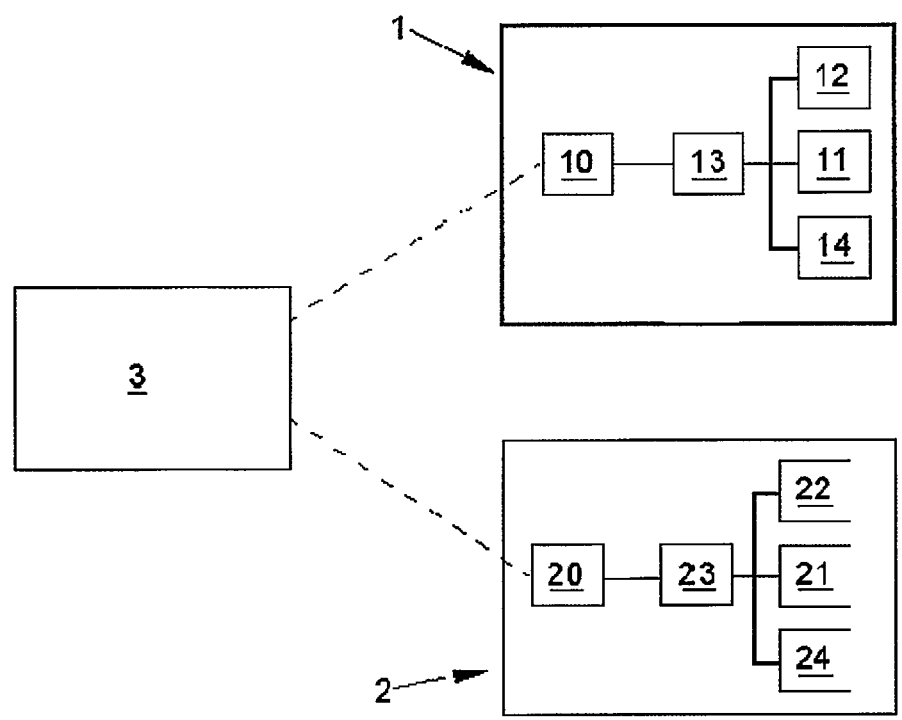
FIG. 1 shows an exemplary embodiment of the disclosed system.

To increase the efficiency and safety in traffic and in logistics, in particular when transporting goods, or else when transporting persons, the aim is to extensively automate vehicles. For this purpose, techniques are already known which relieve pressure on the driver by means of automatic interventions in the control of a vehicle at various levels or carry out individual driving maneuvers in a fully automatic manner. This extends to remote control or to the autonomous driving of a route by a vehicle.

DE 10 2005 059 517 A1 describes such a system for guiding and operating a vehicle without a driver, data being forwarded from sensors of the vehicle to an operations center and operating data for controlling the vehicle being transmitted from the operations center to the vehicle. In this case, data transmission between the vehicle and the operations center in near real time is assumed and a time delay which possibly occurs is technically compensated for.

In the method described in DE 10 2013 212 255 A1, a first vehicle uses a sensor system to check a space relative to the first vehicle and transmits the result of the check to a second vehicle. As a result, the second vehicle can be informed, for example, of whether a space in the environment of the first vehicle is free and whether it is possible to move back into a lane.

In the method described in DE 10 2013 225 011 A1, in a motor vehicle traveling in a highly automated manner, the motor vehicle's own position is compared with external data relating to a current traffic situation and a decision is made with regard to whether it is necessary to change the driving state. It is detected whether the vehicle is traveling toward an obstacle or a route section which otherwise cannot be automatically driven on. This may result in the automated journey being aborted, for instance. For example, it is possible to process a blockage of a route section in front of the vehicle for the automated journey or a traffic jam message can be used to abort the highly automated journey in good time.

A central prerequisite for the safe operation of such systems is a high degree of redundancy in the safety precautions used. Typically, the automatic performance of a driving maneuver presupposes the presence of a driver who monitors the movement of the vehicle and can carry out corrective interventions. This prevents malfunctions of the system, for instance in the case of defective sensors or in unusual traffic situations. In this case, completely automatic driving is therefore not implemented, but rather assisted driving. In this case, the degree of automation is adapted to the technical design of the system, in particular the redundancies provided.

If the system is intended to be operated in a fully automatic manner, that is to say without a driver being provided for each vehicle, high degrees of redundancy must be provided at the technical level. This is achieved, for instance, by installing a multiplicity of sensors—some of which have multiple configurations—in the vehicle. However, the possibilities of integrating sensors in a vehicle are spatially restricted in this case and considerable additional costs may also arise.

Disclosed embodiments provide a method and a system of the type mentioned at the outset in which control which has a high degree of automation is achieved.

In the disclosed method, a scout trajectory is produced for a scout vehicle and the scout vehicle is guided along the scout trajectory. In this case, the scout environmental data are captured by means of scout sensors. A desired trajectory is produced for the following vehicle and following vehicle environmental data are captured by means of following vehicle sensors. Reference trajectory data are produced on the basis of the scout trajectory and the captured actual trajectory, and reference environmental data are produced on the basis of the scout environmental data. The reference trajectory data and the reference environmental data are transmitted to the following vehicle and a trajectory similarity is determined by means of a trajectory comparison on the basis of the desired trajectory produced and the transmitted reference trajectory data. An environment similarity is determined by means of an environmental data comparison on the basis of the captured following vehicle environmental data and the transmitted reference environmental data and, depending on the trajectory similarity and the environment similarity, automatic control of the following vehicle along the desired trajectory is activated.

The route to be driven on is therefore checked for its drivability in a plurality of stages. A high degree of redundancy and thus a high degree of safety are achieved by combining a scout vehicle, which makes a decision on the automatic driveability of a trajectory, and a following vehicle, which checks the data from the scout vehicle during driving. A check is carried out to determine whether the desired trajectory, which is intended to be automatically driven on by the following vehicle, corresponds to a trajectory previously assessed as automatically drivable and a check is continuously carried out to determine whether the conditions on the route have changed since the route was driven on by the scout vehicle, that is to say whether a route which was previously automatically driven on can also still be safely automatically driven on.

According to the disclosed embodiments, "trajectory" denotes a movement path along which one of the vehicles involved can travel. "Trajectory" can be understood as meaning movement paths which have actually been travelled and planned movement paths. The trajectory can be of any desired length; for example, it may comprise a route section on a road or a longer route between two geographical positions.

According to the disclosed embodiments, "trajectory similarity" denotes a measure which quantitatively indicates the degree of similarity of two or more trajectories. A higher value of the trajectory similarity may represent greater similarity in this case. It is therefore possible to determine whether trajectories compared with one another substantially match one another or how greatly they differ from one another. For example, the distance between the trajectories, in particular their minimum and maximum distance, can be taken into account in this case. Direction changes along the trajectories to be compared can also be taken into account, for instance by considering the first derivative of the trajectories, with the result that trajectories running in a parallel manner, for example, can be assessed to be more similar than those with a very different course.

In the first operation, a route or a route section, for example, a public road, a path inside a closed area or in a building, is driven on by a scout vehicle. In this case, a scout trajectory is first of all produced and the scout vehicle is guided along the scout trajectory. In the case of automatic production, the scout trajectory can be produced, for instance, by a journey planner or a navigation system of the scout vehicle and assistance systems. The scout trajectory then corresponds to a calculated movement path of the vehicle. Furthermore, the scout trajectory can be produced in another manner, for instance manually, by remote control or by another specification, for instance by means of capture from an external database. The scout vehicle is therefore guided along the scout trajectory; in particular, the vehicle is guided automatically.

The scout trajectory is produced in such a way that data relating to the scout trajectory are present and allow a comparison with other trajectories. For this purpose, reference trajectory data which comprise, for instance, all relevant information relating to the scout trajectory are produced. The reference trajectory data may also consist of the scout trajectory. These reference trajectory data are transmitted to the following vehicle and can now be processed by the latter. The transmission can be carried out in various ways which are known per se, by means of a radio connection, for instance directly or indirectly via a data transmission network.

The scout vehicle also comprises scout sensors which are used to capture scout environmental data. These environmental data characterize the route driven on and therefore relate, for instance, to features of the ground which has been driven on, for example, the route course, road markings or the condition of the ground covering, signs, buildings, plants and landscape features in the environment of the route. The sensors used are known per se and can be combined as desired.

To also make it possible for the following vehicle to process the scout environmental data, reference environmental data are produced and comprise, for instance, all relevant information for the scout environmental data. These reference environmental data are transmitted together with the above-mentioned reference trajectory data, to the following vehicle and can now be processed by the latter. The transmission can again be carried out in various ways which are known per se, by means of a radio connection, for instance directly or indirectly via a data transmission network.

The scout vehicle thus drives on the scout trajectory, reference trajectory data and reference environmental data are produced and a check can now be carried out to determine whether the following vehicle can automatically drive on the trajectory:

A desired trajectory is first of all produced, for instance by a journey planner of the following vehicle, along which desired trajectory the following vehicle is intended to be automatically controlled. The scout vehicle and the following vehicle may comprise similar or functionally identical journey planners which, owing to their function, calculate at least approximately identical trajectories under the same conditions. However, different journey planners may also be used or similar journey planners may arrive at different results on account of changed circumstances.

The following vehicle receives the reference trajectory data and carries out a trajectory comparison, in which case, the desired trajectory is compared with the scout trajectory. Sections of the trajectories which at least correspond to one another are considered. It is therefore quantified whether and how greatly the trajectories produced by the systems of the scout vehicle and of the following vehicle differ.

The following vehicle also comprises following vehicle sensors which capture following vehicle environmental data. In this case, these sensors may capture substantially the same features of the route and of the environment as the sensors of the scout vehicle, but the same sensor types are not necessarily used and the number of sensors may differ. The important factor is that the following vehicle environmental data and the scout environmental data provide at least partially comparable results, for example, by virtue of the data identifying the position of particular buildings at the edge of the route or detecting other structures, for instance a road marking or traffic signs.

The following vehicle environmental data and the reference environmental data are compared with one another in the following vehicle and an environment similarity is determined. Checking the environment similarity makes it possible to ensure that the following vehicle is actually on the same trajectory as the scout vehicle and it is possible to check whether and to what extent the features of the route to be driven on have changed after the route has been driven on by the scout vehicle. For example, it is possible to determine whether the course of the road has changed since then, for instance in the case of roadworks, and whether these changes are so serious that the route possibly can no longer be automatically driven on in a safe manner.

Threshold values, for instance, can be determined for the trajectory similarities and for the environment similarity to decide whether a trajectory can be automatically driven on by the following vehicle in a safe manner. These threshold values can be permanently defined or can be determined in a variable manner. If the similarities are great enough, i.e., if they exceed the corresponding threshold values, the automatic control of the following vehicle for the desired trajectory is activated, that is to say the automated journey of the following vehicle along the desired trajectory is enabled.

The following vehicle captures, in particular, further data for automatic control. For this purpose, further sensors may be present or the same sensors as those used for the comparison with the scout environmental data can be used. For example, it is possible to capture data relating to moving objects in the immediate environment of the following vehicle, from which the following vehicle must keep its distance or must evade. These data are not relevant to the comparison with the scout environmental data since they are not features of the route driven on, but rather depend on the individual vehicle and typically change in the short term.

In at least one disclosed embodiment of the method, a safe driving mode of the following vehicle is activated if automatic control of the following vehicle is not activated. This means that the following vehicle is safely guided on a trajectory which is unsuitable for automatic control For example, the environmental data similarity or the trajectory similarity can then no longer reach the particular threshold value if the route guidance has changed after the scout vehicle has captured the scout environmental data. For example, roadworks or a barrier in the event of an accident may result in it being necessary to swerve into another lane and the alternative route no longer being assessed as automatically drivable. In the safe driving mode, the speed of the vehicle can be reduced, possibly until the vehicle stops at a suitable location. Furthermore, a driver of the following vehicle can be notified and can assume manual control of the following vehicle, the driver being able to be situated in the following vehicle or the following vehicle being able to be remotely controlled.

The driver can be notified, for example, by outputting an acoustic and/or visual warning signal. Whereas the driver can deal with other tasks while the automatic control is activated, he now assumes control manually. In this case, the manual control can nevertheless be assisted by various assistance systems, for example, a lane-keeping assistant, adaptive cruise control and/or a lane-change assistant. Furthermore, a particular period may be provided for the transition from the automatic control to the manual control, the following vehicle being stopped at a suitable location, for example, when the driver does not assume control within the particular transition period.

In at least one disclosed embodiment of the method, the scout vehicle is controlled automatically. This makes it possible to achieve a high degree of automation. The automatic journey of the scout vehicle can likewise be activated by the disclosed method, in which case the scout trajectory and the scout environmental data are then compared with reference data from a further vehicle which has driven on the trajectory ahead of the scout vehicle. The method can therefore be applied to a number of vehicles which each assume different roles for one another.

Alternatively or additionally, the scout trajectory can also be produced on the basis of inputs by a driver of the scout vehicle. In this case, "inputs" by the driver can also be understood as meaning direct manual interventions in the control of the scout vehicle, for instance steering movements, the actuation of the brake or other pedals and adjustments to the scout vehicle.

In one development, a scout trajectory quality is also determined and the automatic control of the following vehicle is also activated on the basis of the scout trajectory quality. This makes it possible to take into account how reliably the scout trajectory was produced.

According to the disclosed embodiments, "scout trajectory quality" is understood as meaning a measure of how great the uncertainties are with which the determination of the scout trajectory is associated. For example, the scout trajectory can be automatically produced on the basis of sensor data. In this case, the measured values from the sensors have particular variances which are taken into account when determining the scout trajectory. The reference trajectory data comprise information relating to the scout trajectory quality.

According to another disclosed embodiment, the scout trajectory is produced on the basis of an image processing system, the trajectory quality being determined by the image processing system. The detection reliability of the image processing system can be taken into account.

Image data, for instance, can therefore be used to produce the scout trajectory and image recognition can be carried out, for instance to detect traffic signs and extract their contents. In this case, for example, owing to suboptimal visibility conditions, an uncertainty may occur and needs to be taken into account when assessing the scout trajectory.

In one development, the scout trajectory quality is determined on the basis of inputs by the user. As a result, the user can directly influence the approval of the trajectory for automatic drivability and further redundancy is introduced by virtue of the scout trajectory being checked by the user.

For example, the user may be a driver in the scout vehicle. This driver can monitor the journey of the scout vehicle and can detect, for instance, that the scout trajectory cannot be optimally identified for automatic drivability. For example, it is possible to follow a misleading road marking or other important characteristics of traffic management are possibly not detected in an optimum manner. The user can illustrate his assessment by means of an input and this is then taken into account; the trajectory is possibly assessed as not automatically drivable.

In another disclosed embodiment of the method, the scout trajectory, the scout environmental data, the desired trajectory and/or the following vehicle environmental data are transmitted to an external server. The transmission of the data can be managed by the external server and a greater temporal and spatial offset when the trajectory is driven on by the scout vehicle and the following vehicle is enabled.

When automatically driving on a trajectory, following vehicles can transmit the desired trajectory produced and finally driven on by them and the environmental data captured by them to the server.

The external server can store and manage the data transmitted to it. Furthermore, data can also be transmitted to the vehicles via a bidirectional connection, with the result that there is no need for a direct connection between the vehicles.

In one development, the reference trajectory data and/or the reference environmental data are produced by the external server and are transmitted from the external server to the following vehicle. Central management of the reference data can be provided.

Various data relating to automatically drivable trajectories, which are transmitted to the server, and the corresponding environmental data can therefore be linked to one another and taken into account when producing in various ways. Data from various sources, for instance when the trajectory is repeatedly driven on by scout vehicles, can be used, for example, to complete or update trajectory data and/or environmental data. The central management of the reference trajectory data and reference environmental data also allows these data to be distributed to following vehicles in a flexible and anticipatory manner. For example, the relevant data can already be transmitted during the planning of a journey, in particular without the need for a permanent connection for this purpose between the following vehicle and external data sources such as the scout vehicle and/or the external server. Reference trajectory data and reference environmental data can also be pooled and combined in any desired manner by the external server.

This also makes it possible to centrally optimize the production of the reference trajectory data and the reference environmental data without the need to update software of the scout vehicle, for example, for this purpose.

In another disclosed embodiment, the reference trajectory data and/or the reference environmental data are also produced on the basis of additional data. This allows the inclusion of further data.

For example, it is possible to use data from external data sources, for instance from databases or the Internet. Furthermore, manual additions, changes and/or corrections can be made, for example, when manually editing the data. This can be carried out when managing the data and producing the reference trajectory data and reference environmental data on an external server.

In one development, the reference trajectory data and/or the reference environmental data are also produced on the basis of the desired trajectory and/or the following vehicle environmental data. This allows the reference trajectory data and reference environmental data to be continuously updated.

Data from following vehicles which have driven on a route section or a trajectory in an automated manner can be used to check, complete, renew and/or update the existing data record. For example, some environmental data may change over time, for instance the vegetation at the edge of the road over the course of the year or billboards; aging phenomena or replacements, for instance of the road surface or of traffic signs on the road, may also occur, for instance. Filter algorithms can be used to detect which changes make it necessary to conventionally update the existing data records or which changes are so serious that automatic drivability of the trajectory is not possible.

In another disclosed embodiment, the following vehicle captures the scout trajectory by means of the following vehicle sensors. In this case, it is possible to dispense with transmitting the scout trajectory to the following vehicle.

In this case, it is assumed that a visual connection exists between the following vehicle and the scout vehicle. In this case, the following vehicle comprises sensors which make it possible to track the trajectory of the scout vehicle traveling in front, for instance cameras and/or radar or lidar sensors.

In the disclosed system for automatically controlling at least one following vehicle using a scout vehicle, the scout vehicle comprises a scout journey planner which can produce a scout trajectory for the scout vehicle. It also comprises a scout control device which can guide the scout vehicle along the scout trajectory, and scout sensors which can capture the scout environmental data. In this case, the following vehicle comprises a following vehicle journey planner which can produce a desired trajectory for the following vehicle. It also comprises following vehicle sensors which can capture following vehicle environmental data, and a following vehicle control device which can guide the following vehicle along the desired trajectory. In this case, a computing unit can produce reference trajectory data on the basis of the scout trajectory and can produce reference environmental data on the basis of the scout environmental data. The reference trajectory data and the reference environmental data can be transmitted to the following vehicle, and a comparison unit can be used to determine a trajectory similarity by means of a trajectory comparison on the basis of the desired trajectory produced and the transmitted reference trajectory data. The comparison unit can also be used to determine an environment similarity by means of an environmental data comparison on the basis of the captured following vehicle environmental data and the transmitted reference environmental data. Finally, depending on the trajectory similarity and the environment similarity, it is possible to activate automatic control of the following vehicle along the desired trajectory.

The disclosed system is designed to implement the disclosed method described above. The disclosed system, therefore, has the same benefits as the disclosed method.

In at least one disclosed embodiment of the system, the scout control device is formed in such a way that it can automatically guide the scout vehicle. This achieves a high degree of automation. The scout vehicle can likewise be automatically guided by checking previously captured environmental data and trajectory data, for instance, if the disclosed method is carried out in a number of vehicles which can assume the function of the scout vehicle and following vehicle for one another.

In addition or as an alternative to automatically guiding the scout vehicle, manual guidance by a driver may also be provided. In addition to automatic guidance, the driver can intervene, can check the automatic guidance or can completely assume the guidance of the vehicle.

In another disclosed embodiment, the scout journey planner can also determine a scout trajectory quality and the automatic control of the following vehicle can also be activated on the basis of the scout trajectory quality. This makes it possible to implement a redundancy level on the basis of which it is possible to assess the automatic drivability of the scout trajectory. In this case, the scout trajectory quality can be determined in various ways, for instance by assessing image data and processing them to produce the scout trajectory. A manual assessment, for instance by a driver, can also be taken into account.

In one development, the system also comprises an external server and the scout trajectory, the scout environmental data, the desired trajectory and/or the following vehicle environmental data can be transmitted to the external server. This makes it possible to centrally manage the data.

It is possible to combine, complete and/or update data from different sources. Furthermore, the reference trajectory data and/or reference environmental data can be produced by the external server. The relevant data can also be made available to different vehicles without the need for a direct data connection for this purpose; the transmission can also be carried out in a temporally offset manner.

An exemplary embodiment of the disclosed system is explained with reference to FIG. 1.

The system comprises a scout vehicle 1, a following vehicle 2 and an external server 3. The scout vehicle 1 and the following vehicle 2 are at least occasionally connected to the external server 3 using data technology. For this purpose, the system comprises data interfaces 10 and 20 of the scout vehicle 1 and of the following vehicle 2. In this manner, data can be transmitted from the vehicles to the external server 3, can be stored there and can be transmitted from the external server 3 to the vehicles. This makes it possible to indirectly interchange data between the scout vehicle 1 and the following vehicle 2 without the need for a direct connection between the two.

The connection using data technology can be effected wirelessly, for example, by means of a local area network or a larger network, for example, the Internet. Furthermore, the connection can be established via a telecommunications network, for instance a telephone network, or a wireless local area network (WLAN). The connection can also be established indirectly via a further unit which itself can establish a connection to the external server. For example, a connection using data technology may exist between the mobile unit and a mobile telephone connected to the Internet, for instance by means of a data cable or a radio connection, for instance by means of Bluetooth. The connection to the external server 3 can be established via the Internet.

In another exemplary embodiment, the scout vehicle 1 and the following vehicle 2 are directly connected to one another as an alternative or in addition to the external server 3. In this case, the system does not necessarily comprise the external server 3. In this case, data can be interchanged directly between the vehicles.

The scout vehicle 1 comprises a control unit 13 to which the data interface 10, a journey planner 12 and a capture unit 11 are coupled. The journey planner 12 of the scout vehicle 1 produces a scout trajectory. Furthermore, the capture unit 11 captures scout environmental data. The scout vehicle 1 also comprises an autopilot 14 which can guide the scout vehicle 1 along the route produced by the journey planner 12.

The automatic control by the autopilot 14 is carried out according to methods which are known per se, by means of automatic interventions of the longitudinal and lateral acceleration of the scout vehicle 1. This makes it possible to control the direction and magnitude of the vehicle speed. In this case, the autopilot starts from a scout trajectory determined by the journey planner 12 of the scout vehicle 1, but the trajectory actually driven on by the scout vehicle 1 may differ from the scout trajectory produced, for instance if obstacles have to be evaded or the traffic flow requires deviation from the previously calculated trajectory. The automatic control by the autopilot 14 presupposes that the automatic control has been activated by the control unit 13.

Furthermore, sensors of the capture unit 11 capture image data in the environment of the scout vehicle 1, in which case infrared cameras are also used in addition to sensors for the visible part of the light spectrum. Radar and lidar sensors are also used. In further disclosed embodiments, any desired further suitable sensors of the scout vehicle 1 can be used. The captured environmental data comprise characteristic features in the environment of the trajectory which has been driven on, for example, features of the ground which has been driven on, for example, the route course, road markings or the state of the ground covering, signs, buildings, plants and landscape features in the environment of the route.

A trajectory quality is also determined when producing the scout trajectory by means of the journey planner 12. In this case, the certainty with which the automatically produced scout trajectory has been determined is quantified. For example, image data provided by the capture unit 11 can be used to detect when poor visibility conditions prevail or particular situations can be automatically assessed with difficulty. For example, this may be due to a confusing traffic situation or poorly legible traffic signs. In this case, the trajectory quality expresses that the scout trajectory produced should be carefully assessed and the automatic journey should possibly be assisted by further safety systems and redundant devices of the vehicle.

In addition, provision may be made for the movement of the scout vehicle 1 to be captured by the capture unit 11. In this case, the real actual trajectory of the scout vehicle 1 may be determined according to methods known per se, on the basis of the data from a satellite-based positioning system.

In a similar manner to the scout vehicle 1, the following vehicle 2 also comprises a control unit 23 which is coupled to the data interface 20, a journey planner 22 and a capture unit 21. It also comprises an autopilot 24 which can automatically control the following vehicle 2. The capture unit 21 captures following vehicle environmental data. Provision may also be made for sensors of the capture unit 21 to capture the trajectory which has actually been driven by the following vehicle 2.

In the exemplary embodiment illustrated, the external server 3 comprises a computing unit which can produce reference data records, in particular reference trajectory data and reference environmental data, on the basis of data captured by the scout vehicle 1 or the following vehicle 2. The control units 13, 23 of the scout vehicle 1 and of the following vehicle 2 also comprise comparison units which can carry out the comparisons of data relating to trajectories and environmental data.

An exemplary embodiment of the disclosed method is explained with reference to FIGS. 1 and 2.

Figure 2:
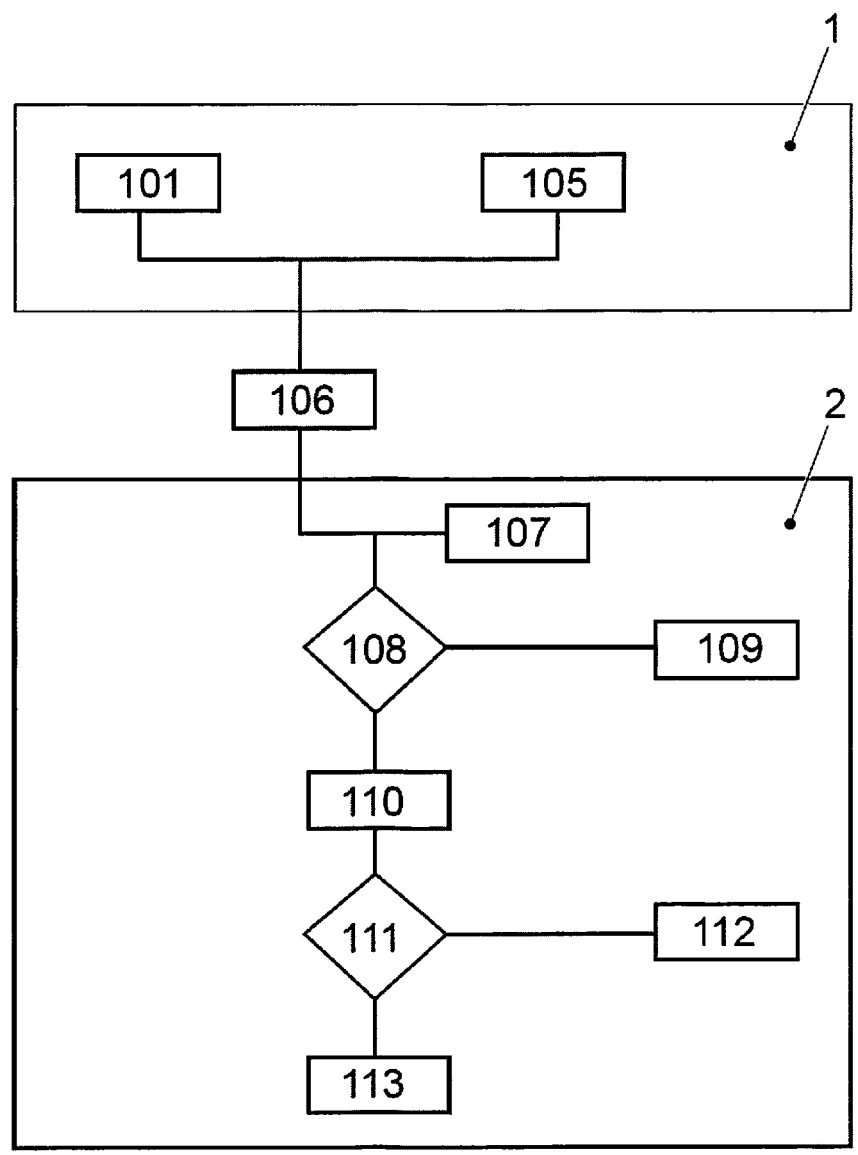
FIG. 2 shows an exemplary embodiment of the disclosed method.

In this example, the disclosed method is implemented by the system illustrated in FIG. 1. The presentation of the operations which are used to carry out the disclosed method does not necessarily reflect the order in which individual operations are carried out. These operations can also be carried out with a greater or shorter temporal interval or at the same time. Furthermore, there is only an exemplary illustration of which operations are carried out by which component of the system. This can differ in other exemplary embodiments; in particular, the external server 3 can carry out operations which are illustrated here as belonging to the vehicles.

In an operation at 101, the journey planner 12 determines a scout trajectory in the scout vehicle 1. The scout vehicle 1 is automatically guided along the scout trajectory. In this case, the steering and the speed of the scout vehicle 1 are automatically controlled by the autopilot 14.

In the exemplary embodiment, a scout trajectory quality is also determined, which scout trajectory quality indicates a safety assessment of the automatically produced trajectory. This can be assisted by inputs by a driver of the scout vehicle 1 or by externally monitoring the journey of the scout vehicle 1. If the scout trajectory quality falls below a particular value, the scout trajectory is assessed as not automatically drivable and the automatic journey can be deactivated by the control unit 13 and a safe driving mode of the scout vehicle 1 can be activated, in which case the control is carried out manually by a driver or remote control is carried out, for instance. The actual trajectory of the scout vehicle 1 which is now produced by other devices, for instance by manual control of the scout vehicle 1, can replace the automatically produced scout trajectory in this case.

In a next operation at 105, sensors of the capture unit 11 capture scout environmental data. The scout environmental data can be continuously captured, irrespective of the scout trajectory determined in the operation at 101.

In an operation at 106, the scout trajectory and scout environmental data are transmitted to the following vehicle 2, a processing operation possibly preceding the actual transmission. In this case, only relevant data are transmitted for instance, those scout environmental data which have been determined as particularly characteristic of the course of the scout trajectory or those parts of the scout trajectory which have been identified as relevant to the following vehicle 2. The transmitted data are referred to as "reference trajectory data" and "reference environmental data". These reference data are transmitted in a suitable format and can be evaluated by the following vehicle and can be compared with other data. In one example, the reference trajectory data may correspond to the scout trajectory and the reference environmental data may correspond to the scout environmental data. Furthermore, the reference data may also be produced on the basis of additional data, however, and may comprise, for example, trajectory and environmental data which have been captured by other vehicles or at different times. In this case, the reference data can be continuously updated, thus ensuring that reference data which are as current and relevant as possible are always transmitted.

In this case, a bidirectional connection between the scout vehicle 1 and the following vehicle 2 can be used to interchange information relating to the data to be transmitted. The following vehicle 2 can request the transmission of reference data and can specify the type of requested data in its request.

The transmission is carried out here indirectly via the external server 3, as shown in FIG. 1. In this example, the external server 3 assumes the task of a memory and a management means for the reference data. In another exemplary embodiment, a direct connection exists between the scout vehicle 1 and the following vehicle 2 with the trajectories and the environmental data of different vehicles being taken into account.

In another exemplary embodiment, the actual trajectory is not transmitted to the following vehicle 2, but rather sensors of the capture unit 21 of the following vehicle 2 capture the actual trajectory of the scout vehicle 1 if the latter is in the visual range in front of the following vehicle.

In an operation at 107, the journey planner 21 of the following vehicle 2 produces a desired trajectory for the following vehicle 2. In a further operation at 108, the desired trajectory and the reference trajectory data are compared and a trajectory similarity is determined. The desired trajectory is compared with the scout trajectory in this case. If a particular threshold value is undershot in this case, that is to say if the desired trajectory differs considerably from the reference trajectory data, the automatically planned desired trajectory is assessed as not automatically drivable in a safe manner in an operation at 109 and the method is aborted since the scout vehicle 1 and the following vehicle 2 are on different trajectories. In this case, the automatic control of the following vehicle 2 is not activated, but rather a safe driving mode is activated. This comprises, for example, manual control by a driver and/or the initiation of braking.

In contrast, if the threshold value is reached or exceeded, the desired trajectory is initially assessed as automatically drivable since, for instance, the journey planner 22 of the following vehicle 2 has selected the same trajectory as was previously driven on by the scout vehicle. This is used to derive the information that the following vehicle 2 is substantially on the same trajectory as the scout vehicle 1 beforehand. In an operation at 110, following vehicle environmental data are now captured. This is carried out in a similar manner to the capture of the scout environmental data by the scout vehicle 1 in the operation at 105.

In an operation at 111, the reference environmental data which have been transmitted to the following vehicle 2 in the operation at 106 are compared with the captured following vehicle environmental data. Another threshold value is determined for the environmental data similarity, in which case the desired trajectory is assessed as not automatically drivable in a safe manner in an operation at 112 if the threshold value is undershot.

This means that features characteristic of the desired trajectory differ from features of the scout trajectory, that is to say that changes have emerged since the route was driven on by the scout vehicle 1. It is therefore assumed that features of the trajectory which are relevant to the safety of an automatic journey have also changed and the assessment of the automatic drivability of the trajectory by the scout vehicle 1 is not correct (any more).

In the operation at 112, a safe driving mode of the following vehicle 2 is activated by virtue of a driver monitoring or actively intervening in the guidance of the following vehicle 2 as an alternative or in addition to the autopilot 24. In the case illustrated, this is carried out by a driver in the following vehicle 2 and, in other exemplary embodiments, the driver may be in the scout vehicle 1, for example, or may transmit control signals to the following vehicle 2 from an operations center via the external server 3. If there is no intervention by the driver, the following vehicle 2 may be stopped automatically.

However, if the environmental data similarity exceeds or reaches a particular threshold value, the automatic control of the following vehicle 2 along the desired trajectory is then activated in an operation at 113. In this case, the autopilot 24 of the following vehicle 2 assumes the control of the following vehicle 2 in the longitudinal and transverse directions. This is carried out on the basis of data captured by the capture unit 21, for instance information relating to positions and the movement of other road users, the road course, obstacles on the road and traffic law restrictions such as speed restrictions or overtaking bans.

Figure 3A:
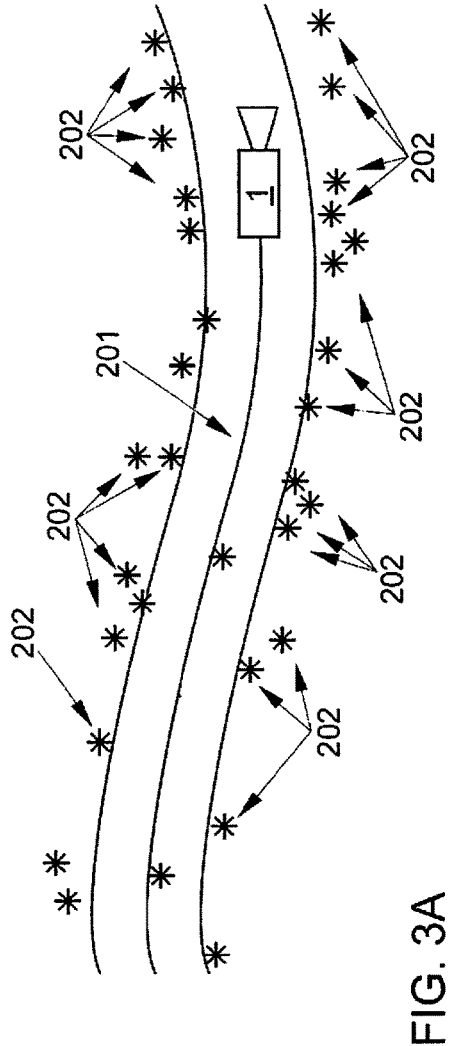
FIG. 3A shows a further exemplary embodiment of the disclosed method.
Figure 3B:
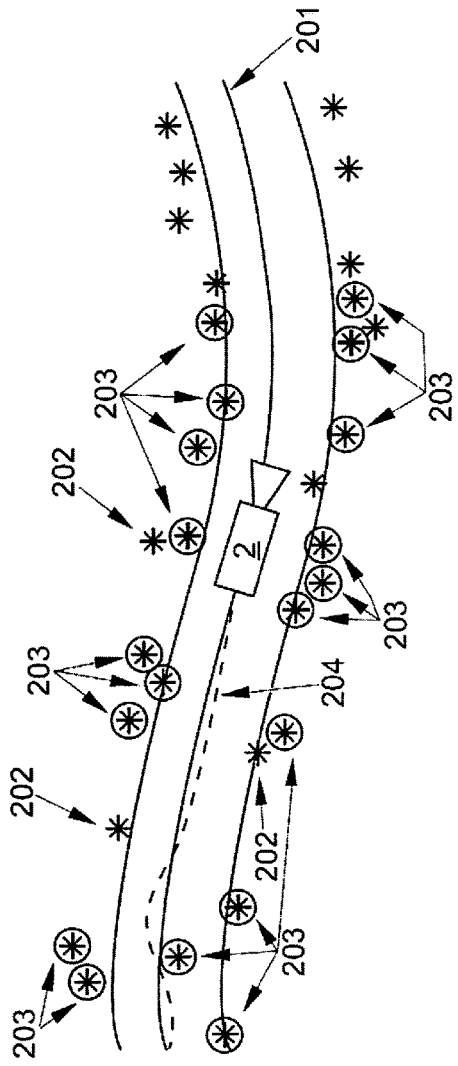
FIG. 3B shows a further exemplary embodiment of the disclosed method.

Another exemplary embodiment of the disclosed method is explained on the basis of FIGS. 3A and 3B. In this example, the disclosed method is implemented by the system illustrated in FIG. 1.

The scout vehicle 1 first of all drives on a route, by means of autopilot 14, along the scout trajectory 201 produced for the scout vehicle 1. Meanwhile, the sensors of the capture unit 11 of the scout vehicle 1 capture scout environmental data 202 which comprise scout orientation points 202 and are illustrated as stars in FIGS. 3A and 3B. In the case illustrated, these are traffic signs on the road and at the edge of the route as well as buildings and special landscape features, for instance individual trees, in the environment of the actual trajectory 201.

At the same time, in the example illustrated, the scout trajectory 201 is checked and approved by a driver of the scout vehicle 1, in which case the scout trajectory quality of the scout trajectory determined by the journey planner 12 of the scout vehicle 1 is assessed. That is to say, the driver who is in the scout vehicle 1 in the example illustrated confirms the quality of the scout trajectory 201 produced by the journey planner 12. The automatically generated scout trajectory 201 is therefore assessed as automatically drivable.

The following vehicle 2 drives on the same route at a later time. The journey planner 22 of the following vehicle 2 produces a desired trajectory 204. Reference trajectory data are produced on the basis of the scout trajectory 201 and are transmitted to the following vehicle 2. The reference trajectory data are compared with the desired trajectory 204 and a trajectory similarity is determined. The trajectory similarity quantifies the differences between the compared trajectories, and its value is higher, the more similar the trajectories are. The trajectory comparison can be carried out in different ways; in particular, spatial distances between the trajectories can be quantified and the course of the trajectories can be compared on the basis of their derivative. Differences between the trajectories are weighted by means of a filter algorithm, according to how relevant they are to the automatic drivability of the desired trajectory 204. For example, traffic-related swerving on account of a vehicle moving back into a lane is weighted as less relevant than a considerable deviation of the direction of travel, for instance on account of roadworks. Other deviations can be taken into account more strongly, for instance rapid direction changes or road chicanes, for instance in the case of roadworks. Further data beyond the mere trajectories can also be taken into account when producing the trajectory similarity, for example, by the systems for producing the trajectories.

Furthermore, reference environmental data are produced on the basis of the scout environmental data and are transmitted to the following vehicle 2. In the example illustrated, the reference environmental data comprise the scout orientation points 202.

In the case illustrated, the trajectory similarity is great enough to start from essentially the same trajectories. At the same time, the following vehicle 2 captures its own following vehicle environmental data with following vehicle orientation points 203 and compares them with the reference environmental data. In this case, some of the scout orientation points 202 match the following vehicle orientation points 203 captured by the following vehicle 2. For example, trees or traffic signs are captured at the same position.

During the comparison, the different features are prioritized. For example, the consequences for the environmental data similarity are less serious if some of the planted vegetation at the edge of the route has changed than if the course of a lane has changed. Furthermore, vehicle data relating to the scout vehicle 1 are taken into account, for instance its height which need not be identical to the height of the following vehicle 2.

In a comparison, an environmental data similarity is determined which exceeds a previously determined threshold value in the case illustrated. Therefore, the automatic control along the desired trajectory 204 on the basis of the autopilot 24 is activated for the following vehicle 2.

In another exemplary embodiment, trajectory data and environmental data, in particular also from different vehicles, are stored by the external server 3 and the reference data are produced on the basis of these data and are transmitted to the following vehicle 2. This central storage makes it possible to expand and/or update the reference data, for example, on the basis of the following vehicle environmental data captured by the following vehicle 2 and transmitted to the external server 3: if it is detected in this case, for instance, that one of the scout orientation points 202 is no longer present, for example, because a parked vehicle has been moved along at the edge of the route, the data record stored on the external server 3 can be accordingly adapted. In this case, a filter algorithm determines whether the changes are minor and an adaptation can therefore be carried out or whether the changes restrict the automatic drivability of the scout trajectory 201, which makes it necessary to newly capture scout environmental data 202 along the scout trajectory 201 by means of a manually guided scout vehicle 1.

In another exemplary embodiment, the following vehicle 2 does not capture one of the following vehicle orientation points 203 with sufficient quality; for example, a traffic sign cannot be automatically read with sufficient certainty in poor visibility conditions. Following vehicle environmental data, image data relating to the traffic sign in this example, are now transmitted to the scout vehicle 1, the driver of which acts as a decision point. The driver can now decide whether the automatic journey can be safely continued and can transmit control signals, for instance, to the following vehicle 2, which control signals represent the content of the traffic sign. The decision point can also be incorporated in the system via the external server 3.

In another exemplary embodiment, a series of further data may also be taken into account when producing the reference environmental data or reference trajectory data. The external server 3 accesses further data sources via the Internet and there captures, for example, data relating to temporary or permanent changes in the route guidance or additional information relating to a trajectory, for instance a road section, for example, a blockage for automatic driving.

LIST OF REFERENCE SYMBOLS

1 Scout vehicle
2 Following vehicle
3 External server; center
10 Data interface (scout vehicle)
11 Sensors (scout vehicle)
12 Scheduler (scout vehicle)
13 Control unit (scout vehicle)
14 Autopilot (scout vehicle)
20 Data interface (following vehicle)
21 Sensors (following vehicle)
22 Journey planner (following vehicle)
23 Control unit (following vehicle)
24 Autopilot (following vehicle)
101 Production of scout trajectory
105 Capture of scout environmental data
106 Transmission of reference data
107 Production of desired trajectory
108 Comparison of scout and desired trajectories
109 Abort
110 Capture of following vehicle environmental data
111 Comparison of scout and following vehicle environmental data
112 Assessment of the desired trajectory as not automatically drivable
113 Activation of the automatic control
201 Scout trajectory of the scout vehicle
202 Scout orientation points; scout environmental data
203 Following vehicle orientation points; following vehicle environmental data
204 Desired trajectory of the following vehicle

The invention claimed is:

1. A method for automatically controlling at least one following vehicle, the method comprising:
producing a scout trajectory for a scout vehicle and the scout vehicle is guided along the scout trajectory;
capturing scout environmental data by scout sensors;
producing a desired trajectory for a following vehicle, wherein following vehicle environmental data are captured by following vehicle sensors;
producing reference trajectory data based on the scout trajectory and reference environmental data based on the scout environmental data;
transmitting the reference trajectory data and the reference environmental data to the following vehicle;
determining a trajectory similarity by a trajectory comparison based on the desired trajectory produced and the transmitted reference trajectory data;
determining an environment similarity by an environmental data comparison based on the captured following vehicle environmental data and the transmitted reference environmental data; and
activating automatic control of the following vehicle along the desired trajectory depending on the trajectory similarity and the environment similarity.

2. The method of claim 1, wherein, in response to no automatic control of the following vehicle being activated, a safe driving mode of the following vehicle is activated.

3. The method of claim 1, wherein the scout vehicle is automatically controlled.

4. The method of claim 1, wherein a scout trajectory quality is also determined, and the automatic control of the following vehicle is also activated based on the scout trajectory quality.

5. The method of claim 4, wherein the scout trajectory is produced based on an image processing system, the scout trajectory quality is determined by the image processing system.

6. The method of claim 4, wherein the scout trajectory quality is determined based on inputs by a user.

7. The method of claim 1, wherein the scout trajectory, the scout environmental data, the desired trajectory, and/or the following vehicle environmental data are transmitted to an external server.

8. The method of claim 7, wherein the reference trajectory data and/or the reference environmental data are produced by the external server and are transmitted from the external server to the following vehicle.

9. The method of claim 8, wherein the reference trajectory data and/or the reference environmental data are also produced based on additional data.

10. The method of claim 1, wherein the reference trajectory data and/or the reference environmental data are also produced based on the desired trajectory and/or the following vehicle environmental data.

11. The method of claim 1, wherein the following vehicle captures the scout trajectory by the following vehicle sensors.

12. A system for automatically controlling at least one following vehicle using a scout vehicle, wherein the scout vehicle includes a navigation system configured to produce a scout trajectory for the scout vehicle for guiding the scout vehicle along the scout trajectory, and wherein the scout vehicle includes scout sensors which capture scout environmental data, the system comprising:
- a following vehicle that includes a navigation system configured to produce a desired trajectory for the following vehicle, wherein the following vehicle includes following vehicle sensors which capture following vehicle environmental data, wherein the following vehicle is guided along the desired trajectory,
- wherein reference trajectory data, which is based on the scout trajectory and produces reference environmental data, which is based on the scout environmental data, are received by the following vehicle,
- wherein a trajectory similarity is determined in the navigation system of the following vehicle by performing a trajectory comparison based on the desired trajectory and the received reference trajectory data,
- wherein an environment similarity is determined in the navigation system of the following vehicle by performing an environmental data comparison based on the captured following vehicle environmental data and the received reference environmental data, and
- wherein, depending on the trajectory similarity and the environment similarity, automatic control of the following vehicle along the desired trajectory is activated.

13. The system of claim 12, wherein the scout vehicle is automatically controlled.

14. The system of claim 12, wherein a scout trajectory quality is used to perform automatic control activation of the following vehicle.

15. The system of claim 12, wherein the system further comprises an external server, which receives the scout trajectory, the scout environmental data, the desired trajectory, and/or the following vehicle environmental data.

* * * * *